May 5, 1959 R. E. POTTER 2,885,545
SUPERREGENERATIVE RECEIVER WITH ANTENNA AND OPEN-CIRCUITED DIODE CONNECTED TO INPUT
Filed Dec. 12, 1955
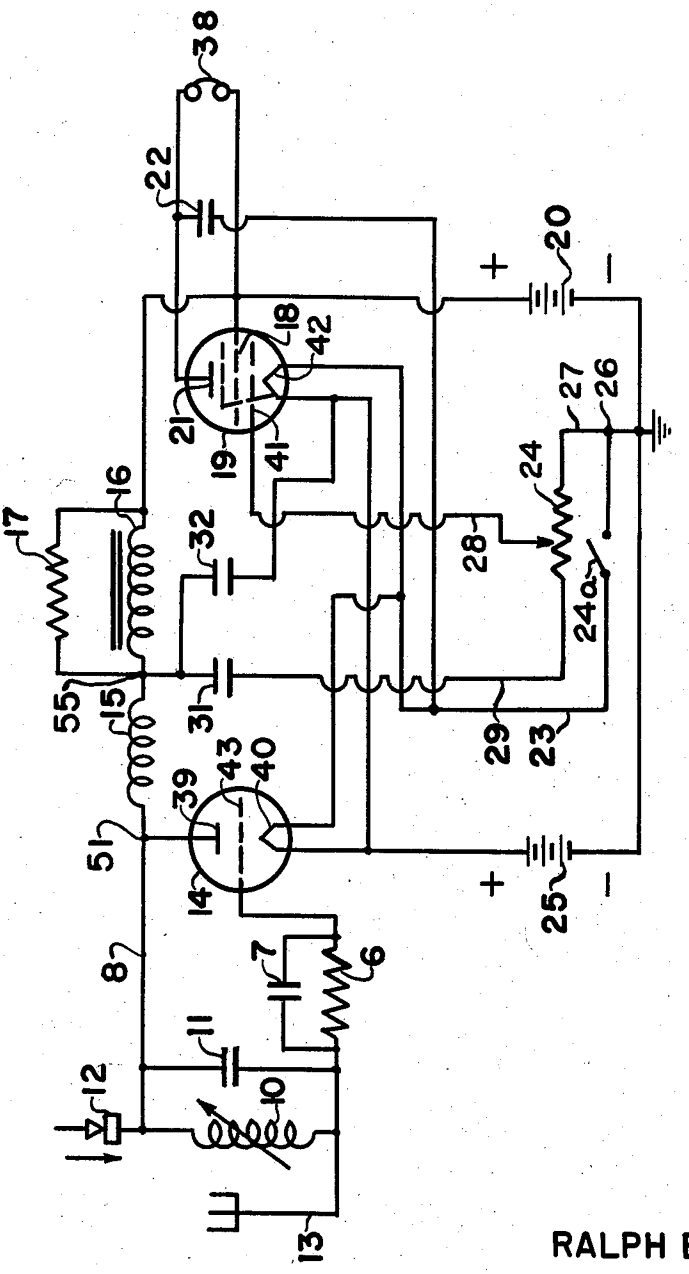
*INVENTOR*
RALPH E. POTTER United States Patent Office 2,885,545

Patented May 5, 1959

2,885,545

SUPERREGENERATIVE RECEIVER WITH ANTENNA AND OPEN-CIRCUITED DIODE CONNECTED TO INPUT

Ralph E. Potter, Washington, D.C.

Application December 12, 1955, Serial No. 552,429

8 Claims. (Cl. 250—20)

This invention relates to regenerative receiving systems, and more particularly to an improved type of superregenerative receiving circuit.

Numerous attempts have been made to build a small portable and satisfactory monitor radio receiver for broadcast transmission programs which may be used at selective locations. However, many small monitor receivers today in the low priced field lack sufficient sensitivity to be practical without a long or bulky antenna.

Therefore, it is accordingly the purpose of this invention to provide a cheap, compact, satisfactory and portable monitor radio receiver which will receive radio and television audio broadcast programs with a very short antenna by the incorporation of a unidirectional device in series with the input inductor, and connected to the side of the RF inductor-capacitor circuit opposite the antenna to decrease noise, increase selectivity and lessen distortion due to tube and tuned circuit fluctuation noise.

Another object of this invention is to provide a superregenerative circuit with a novel and proper balance between the circuit proportions and the amplitude and frequency of the quenching oscillations.

A further object of this invention is to provide a new and novel monitor receiver that features superior sensitivity and selectivity with a minimum of radiation.

A still further object of this invention is to provide a satisfactory superregenerative monitor receiver, which has an inherent and instantaneous automatic volume control characteristic which makes the receiver substantially insensitive to the thermal agitation of the circuit and to external impulse noise such as ignition pulses.

Another object of this invention is to provide a radio circuit suitable for use with auxiliary audio amplifier and speaker equipment as illustrated by the drawing.

Another object of this invention is to provide a new superregenerative circuit having a balanced feedback means directly connecting a portion of the electron energy of the plate means of the detector electrode means to the tuned tank circuit.

These and other objects of the invention will subsequently become apparent by reference to the following description taken in connection with the accompanying drawing which is a schematic diagram of a monitor receiver embodying the invention.

The drawing shows one embodiment of this circuit which may be considered basically as being composed of four component sections as follows: A tuning and detector circuit means generally by the parts bearing reference numbers 6, 7, 10, 11, 12 and 13; a detector and first audio amplifier output section indicated by the parts bearing reference numbers 14—19, 21, 31, 32 and 40—43; an output section indicated by headphones 38; and a power supply and control section as indicated by reference numbers 20, 23—29, and **24*a*. This circuit comprises a resonant RF circuit means, having an inductor means 10 and condenser tuning means 11 for determining the operational frequency of the receiver, and electrode means 14 coupled to the resonant circuit means to constitute a regenerative oscillator circuit. Either inductor 10 or capacitor 11, or both, should preferably be variable to permit tuning. The RF circuit includes an inductor coil 10 of a number of turns, a condenser 11 of small value in M.M.F. connected in parallel across the inductor, a unidirectional device 12 is connected at one end of the inductor means to substantially improve tone quality and selectivity in tuning the circuit, and to decrease noise and lessen high distortion due to tube and tuned circuit fluctuation noise commonly inherent in a conventional superregenerative circuit. The unidirectional device 12 may be a germanium or silicon crystal diode or other suitable unidirectional supplementary antenna and noise eliminating means. A very short antenna 13 is connected at the opposite end of the inductor 10** for purposes of tuned circuit balance.

The detector circuit used in this improved superregenerative circuit, while partly old, is of the self-quenched type of detector in which the detector electrode means 14 damps (or "quenches") itself out of signal frequency oscillation at a very high rate by virtue of the high value of grid leak and proper size plate-blocking and grid capacitors, in conjunction with an excess of feedback. Preferably I use a direct lead 8 to connect the plate means 39 to the tuning circuit as a regenerative feedback means to directly return a portion of the electron energy of the plate 39 to the tuned tank circuit to insure a controlled and balanced regeneration in proper phase relationship to prevent any degenerative effect and to obtain a satisfactory signal which is and may be further amplified for good reception.

The electrode means 14 may consist of a transistor or semi-conductor device means or a triode detector tube means, as for example, depending on the frequency band of operation, electrode means 14 may be a triode tube of the VHF type such as R.C.A. 957 or Raytheon 5676 having anode or plate means 39, cathode means 40 and control grid means 43. The plate 39 of the electrode means 14 is directly connected to grid means 43 by lead 8 and the tuned tank circuit comprising capacitance member 11 and inductance member 10 in series with grid-leak device comprising capacitance member 7 and resistance member 6. Lead member 8 and choke member 15 are purposely connected in parallel to plate 39 of electrode means 14 at junction 51 to give a novel balanced and direct feedback for a more efficient regenerative effect in the complete circuit. The electrode means 19 may consist of a pentode tube, a transistor or a semiconductor device.

The plate 39 of the electrode means 14 is connected through a lead to choke 15. An iron core choke 16, connected in parallel with a grid leak resistor 17 of electrode means 19, is connected in series with the first choke 15, which allows a certain amount of current to flow to and away from the plate of the first electrode means 14 for quenching and regeneration. The audio-frequency choke coil 16 and resistor 17 in parallel circuit arrangement are connected to the screen grid means 18 of the audio output electrode means 19 and thence to positive supply of the B battery 20, the negative side of the battery being grounded. The plate 21 of electrode means 19 is connected to a fixed condenser 22 to the terminal 23 of off-and-on switch **24*a*. The second terminal 26 and volume control terminal 27 of potentiometer 24** (which forms a volume control means) are grounded.

The cathode heater elements 40 and 42 of electrode means 14 and 19, respectively, are connected in parallel to "A" battery 25 through the switch terminals 23 and 26.

A fixed condenser 31 is connected to junction of chokes 15 and 16, and the reactor output means composed of components 16 and 17 is thereby connected to terminal 29 of the volume control potentiometer 24 in proper phase relation for regeneration in the squelch or quench circuit. Between the terminals of the chokes 15 and 16 and a condenser 32 is connected to the cathode means 42 of electrode means 19. Tests disclose that condenser 32 gives satisfactory operating results if connected to either side of heater element 42 or if connected between either the heater element and volume control terminal 29 to prevent high frequency leakage from electrode means 14 in the circuit.

Terminal 28 of the volume control is connected to grid means 41 of electrode means 19. A lead from the screen grid 18 of electrode means 19 is connected to the positive side of the "B" battery 20. Headphones 38 or other output means may be connected to the output of amplifying electrode means 19 in any suitable way.

Choke 15 is purposely placed in the plate circuit of electrode means 14 in series arrangement with choke 16 and resistor 17 as shown by the drawing to give a divisional effect of providing both a balanced feedback energy supply from plate 39 for the detector circuit and filtered control of the remaining electron energy supply of the plate 39 for plate circuit to provide a proper balance between the circuit portions of the radio circuit to give an automatic volume control resulting in a receiver circuit which is substantially insensitive to thermal agitation of the circuit and external impulse noise, such as ignition pulses, resulting in a monitor receiver that features superior sensitivity and selectivity with a minimum of radiation.

In the above circuit, by connecting the feedback of the plate means 39 by lead 8 to the tuning circuit, instead of using a conventional inductively coupled feedback to a cathode and grid circuit, regenerative control is increased by the amplification factor of electrode means 14, which makes for a more sensitive detector circuit whose oscillation action is controlled by self quenching means.

It is to be understood, that the use of my basic circuit is not restricted to the use of batteries as batteries may be replaced with any suitable source of power.

Volume control 24 and switch 24*a* is conventional, being an article of manufacture, similar to Centralab No. B16–228, Clarostat No. AT–128 or IRC taper stock No. Q11–141.

Various changes and modifications may be made in my invention without departing from the spirit and scope thereof. It is to be understood, therefore, that my invention is not limited to the embodiment described herein or in any manner other than by the scope of the appended claims.

Further objects of invention will become apparent in the following appended claims.

Having thus described my invention, what I claim as new and wish to secure by Letters Patent is:

1. In a self quenched superregenerative receiver, a resonant tuning circuit, a detector, quenching means connecting the resonant circuit to the detector providing a quenching frequency superposed on the oscillations at the frequency of the resonant circuit, an antenna feeding the resonant circuit, a rectifier, additional to that of the detector, directly connected at one side thereof to the resonant circuit, and a short conductor open at one end and having its other end connected to the other side of said rectifier and constituting the only thing connected to said other side.

2. The combination of claim 1 in which the resonant circuit includes an inductor, said rectifier being a crystal rectifier having one of its terminals connected directly to one end of the inductor.

3. The combination of claim 1 in which the antenna is connected to the other end of the inductor.

4. In a radio receiver; a superregenerative circuit including a resonant circuit, a detector for detecting the signals in said resonant circuit and quenching means for effecting superregenerative action; an antenna connected to the resonant circuit; and a supplementary antenna, comprising a conductor having a rectifier in series therewith, also connected to said resonant circuit, said antenna and said supplementary antenna being connected respectively to two points on the resonant circuit that have different radio frequency potentials when the circuit is resonanting.

5. In a radio receiver; a tunable resonant circuit; superregenerative means for detecting the signals in said circuit; an antenna connected to said circuit; and a supplementary antenna, comprising a short conductor with a rectifier in series therewith, also connected to said circuit.

6. In a radio receiver; a tunable resonant circuit; superregenerative means for detecting the signals in said circuit; an antenna connected to one end of the resonant circuit; and a supplementary antenna, comprising a short wire with a rectifier in series therewith, connected to the other end of the resonant circuit.

7. In a portable radio receiver, a superregenerative radio receiving circuit including a tunable resonant element for selecting the station to be received and developing a potential at the carrier frequency of such station, portable means mounting said circuit, an antenna connected to one side of said resonant element, and a supplemental antenna and noise reducing means connected to the other side of said resonant element and comprising a short antenna wire having a rectifier in series therewith.

8. A radio receiver as defined in claim 5 in which said resonant circuit includes an inductor, said antenna and said supplementary antenna being connected to spaced points on said inductor.

References Cited in the file of this patent

UNITED STATES PATENTS

| | | |
|---|---|---|
| 1,687,933 | Farrington | Oct. 16, 1928 |
| 2,147,595 | Hilferty | Feb. 14, 1939 |
| 2,799,775 | Florac | July 16, 1957 |

OTHER REFERENCES

Radiotron Designers Handbook, 4th edition, 1953, pp. 517 to 521.

The Radio Handbook, page 111, 13th edition, Editors and Engineers Ltd., Santa Barbara, California.